(No Model.)
H. C. FISH.
STEWING KETTLE OR BOILER.
No. 318,365. Patented May 19, 1885.
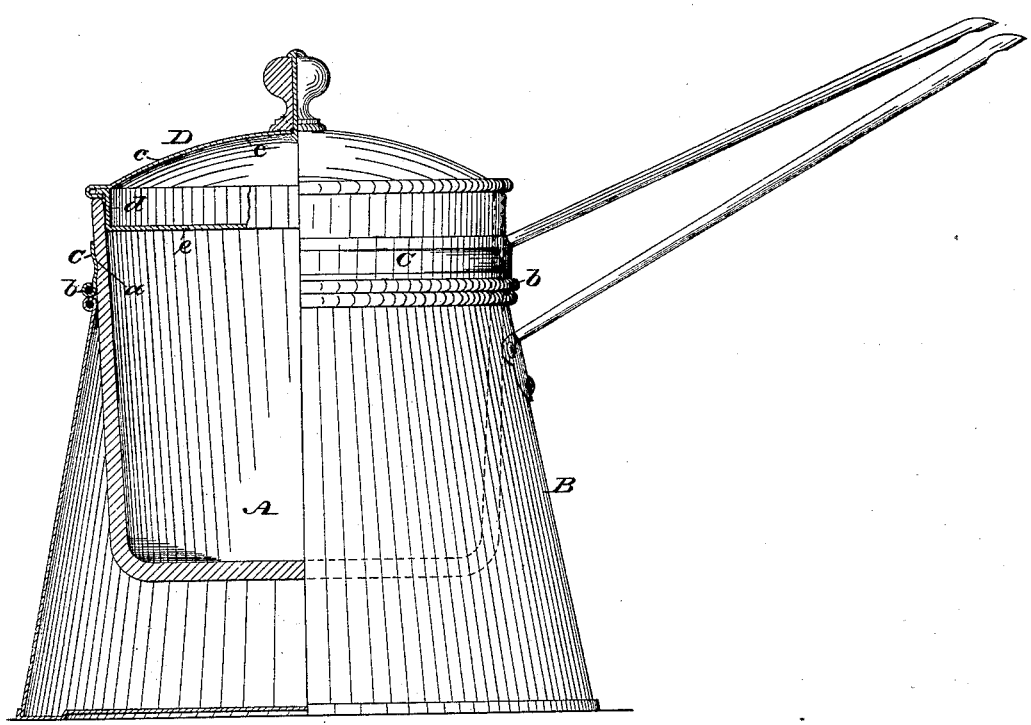
WITNESSES:
A. P. Grant,
W. F. Kircher
INVENTOR:-
H. Clay Fish,
BY John A. Diedersheim
ATTORNEY.

UNITED STATES PATENT OFFICE.

H. CLAY FISH, OF BROOKLYN, NEW YORK.

STEWING-KETTLE OR BOILER.

SPECIFICATION forming part of Letters Patent No. 318,365, dated May 19, 1885.

Application filed May 15, 1884. (No model.)

*To all whom it may concern:*

Be it known that I, H. CLAY FISH, a citizen of the United States, residing at Brooklyn, in the county of Kings, State of New York, have invented a new and useful Improvement in Stewing-Kettles and Boilers, which improvement is fully set forth in the following specification and accompanying drawing, in which the figure is a partial side elevation and partial vertical section of a stewing kettle and boiler embodying my invention.

A stew kettle or boiler has been made of earthenware with a re-enforcing band, of metal, fitted between shoulders on the same, or simply held in place by a tight joint on the kettle or boiler. In the former case the lower shoulder, which rests on an exterior metallic vessel, is liable to be chipped and broken, and in the latter case the band looses its hold and slips from position.

My invention is designed to remedy these defects; and it consists in forming the kettle or boiler with a circumferential groove and a band of metal, with a bead on its lower end, said band being bent to enter the groove and the bead serving to sustain the kettle and receive any blows, which it is well able to endure, when the kettle is fitted in the exterior vessel. As the band interlocks with the walls of the groove of the kettle, it is securely held and prevented from upward displacement.

Referring to the drawing, A represents an earthenware kettle or boiler, and B a metallic vessel on which the kettle A is sustained, and which is adapted to contain the water for boiling the material contained in the kettle, this feature being well known. On the exterior of the kettle is a groove, *a*, and circumscribing the wall thereof is a band, C, of metal, whose ends are soldered or otherwise connected, the band being bent to conform to the shape of the groove. On the lower edge of the band is a bead, *b*, which projects beyond the adjacent surface of the kettle, thus forming a metallic shoulder, which rests on the top of the outer vessel, B, and sustains the kettle A thereon.

It will be seen that the band is interlocked with the kettle, whereby it is prevented from rising and so reliably retains its position. Furthermore, as the shoulder presented by the bead is metal, and it receives the blows or thrust of the kettle when inserted in the vessel B, it is evident that it will not be injured by said blows or thrust or broken or chipped, as is occasioned where a supporting bead or shoulder is integral with the earthenware boiler. Again, by the present construction I avoid both the upper and lower shoulders on a kettle, and thus cheapen the construction of the latter, and the band need not be necessarily held very tightly on the kettle as it may be slightly loose, retaining its interlocking nature with the wall of the groove *a*, the unequal expansion of the band and kettle not affecting said parts, either to break the boiler or snap the band.

I do not limit myself to any special earthenware material of which the kettle is made, as the same may be varied.

D represents a lid, which is formed of a top wall, *c*, a rim, *d*, a base-plate, *e*, a flange, *f*, and bend *g*, but forms no part of the present invention, as any suitable form of a lid may be employed when a cover for the kettle A is required.

Having thus described my invention, what I claim as new, and desire to secure by Letters Patent, is—

An earthenware kettle or boiler having a circumferential groove and a metallic band fitted thereinto provided with a bead, the band and groove interlocking, and the bead forming a shoulder at the bottom of the band, substantially as and for the purpose set forth.

H. CLAY FISH.

Witnesses:
WHITFIELD TERRIBERRY,
PETER McCORMICK.